United States Patent [19]

Priest et al.

[11] Patent Number: 5,541,889
[45] Date of Patent: Jul. 30, 1996

[54] BOREHOLE FLUID REPLACEMENT MEANS AND METHOD

[75] Inventors: John F. Priest, Tomball, Tex.; Mathew G. Schmidt, Palo Alto, Calif.; Roger R. Steinsiek; Paul G. Junghans, both of Houston, Tex.

[73] Assignee: Western Atlas International, Houston, Tex.

[21] Appl. No.: 381,128

[22] Filed: Jan. 31, 1995

[51] Int. Cl.⁶ ............................... G01V 1/40; H01L 41/10
[52] U.S. Cl. ............................. 367/35; 367/25; 367/911; 181/102; 181/105
[58] Field of Search ............................ 367/25, 35, 911, 367/912; 181/102, 105; 166/250

[56] References Cited

U.S. PATENT DOCUMENTS

| | | | |
|---|---|---|---|
| 3,390,737 | 7/1968 | Johnson | 181/5 |
| 3,883,841 | 5/1975 | Norel et al. | 367/911 |
| 4,382,290 | 5/1983 | Havira | 367/35 |
| 4,711,122 | 12/1987 | Angehrn et al. | 73/151 |
| 4,780,862 | 10/1988 | Clerke | 367/35 |
| 4,876,672 | 10/1989 | Petermann et al. | 367/35 |
| 5,109,946 | 5/1992 | Sorrells | 181/106 |
| 5,146,050 | 9/1992 | Strozeski et al. | 181/102 |
| 5,179,541 | 1/1993 | Weido | 367/69 |
| 5,212,353 | 5/1993 | Rambow et al. | 181/106 |
| 5,255,245 | 10/1993 | Clot | 367/25 |

FOREIGN PATENT DOCUMENTS 1762227  9/1992  U.S.S.R. .

*Primary Examiner*—Nelson Moskowitz
*Attorney, Agent, or Firm*—William A. Knox

[57] ABSTRACT

The signal-to-noise ratio of televiewer signals from a rotary sidewall acoustic-beam scanner is improved by replacing the volume of borehole drill fluid that lies in the path of the acoustic beam with a solid medium characterized by a lower coefficient of attenuation than that of the drill fluid.

15 Claims, 3 Drawing Sheets

BOREHOLE FLUID REPLACEMENT MEANS AND METHOD

BACKGROUND OF THE INVENTION

1. Field of the Invention

A downhole acoustic logging tool is provided for imaging the texture and structure of the borehole sidewall. The signal level of the acoustic signals reflected from the sidewall are enhanced by minimizing the length of the travel-path of an acoustic-beam trajectory through highly attenuating borehole fluids.

2. Discussion of Related Art

Typical acoustic logging tools may include by way of example, a circumferential televiewer which comprises a rotating ultrasonic acoustic transducer that operates in a frequency range on the order of 100 kHz or more. Higher acoustic frequencies are preferred in order to achieve better resolution in the confined space of a borehole. In operation, the televiewer rotates at a desired rate such as 5 to 16 rotations per second to continuously scan the borehole sidewall as the televiewer is drawn up the borehole at a preferred rate of 3/16 to 3/8 inch per scan. A beam of acoustic pulses is launched along the normal to the borehole sidewall as the transducer scans the interior surface of the borehole. The pulse rate depends upon the desired spatial resolution such as 1500 pulses per second or 128 to 256 pulses per scan. The insonified borehole sidewall returns pulses reflected therefrom, back to the transducer on a time-multiplexed basis. The reflected acoustic signals are detected, amplified and displayed to provide a continuous picture of the texture and structure of the borehole sidewall. Other application include determination of the goodness of a cement bond to a steel casing as well as monitoring the integrity of the casing itself.

To protect the transducer element and the rotary mechanism from damage, the unit is ordinarily enclosed in an enclosure or cell that is sealed by an acoustic window from invasion by the ever-present borehole fluid. The acoustic window may be a relatively thin plastic boot which is pressure compensated.

The diameter of a borehole logger is on the order of 2 7/8 inches so that it can be run into relatively small boreholes. However many borehole diameters are on the order of ten to fourteen inches or more such that the length of the acoustic-pulse trajectory from the transducer, through the borehole fluid to the borehole sidewall, may be up to ten inches. In the normal course of events, the borehole fluid is contaminated by drill cuttings, air bubbles and foreign matter which severely attenuate the acoustic energy by scattering because the physical dimensions of the contaminants are comparable to the wavelength of the wavefields emitted by the transducer.

What is even more troublesome, however, is the complication that the acoustic attenuation coefficient in certain types of drilling fluid such as heavily-weighted oil-based muds is very high, on the order of 5 dB/cm (12.5 dB/inch). Remembering that the reflected acoustic signals must propagate over a two-way travel path, the maximum path length through the highly-attenuating drilling fluid must be kept well under 4 cm. Even that short path length may result in an attenuation of 20 dB.

Although it is true that the coefficient of attenuation diminishes with decreasing acoustic frequency, space considerations and resolution requirements do not permit the use of large, low-frequency transducers.

The term "attenuation coefficient" is sometimes referred to in the literature as the absorption constant, attenuation constant or simply attenuation. However, the term attenuation coefficient will be used to emphasize the fact that it is the signal strength that is important. The attenuation coefficient is not a constant but is a function of the frequency, characteristics and volume of the medium.

A number of petrophysicists have attempted to reduce the scattering and attenuation effects by reducing the trajectory path length of a pulsed acoustical beam by providing an enlarged, so-called mud excluder around the portion of the logging tool whereon is mounted the acoustic transducer. The mud excluder usually contains a volume of an acoustic transmission medium that minimizes the attenuation effect of the borehole fluids by replacing a volume of fluid characterized by a high attenuation coefficient with a medium that has a much lower attenuation coefficient.

M. L. Johnson in U.S. Pat. No. 3,390,737, issued Jul. 2, 1968 and assigned to Mobile Oil Corp., discloses a borehole liquid excluder which includes a thin-walled plastic boot adapted to surround the tool to displace undesirable borehole material from between the tool and the borehole wall. A coupling means releasably attaches the excluding means to the tool and allows the tool to be separated from the excluding means and be removed upwardly in the event that the excluding means becomes stuck in the borehole. The problem with this device is first, the acoustic window is rather flimsy; it can be easily damaged. The boot may actually be destroyed in a hot hole. Further, the acoustic window is parallel to the longitudinal axis of the logging tool rather than sloping and hence creates undesired ghost reflections by internal reflection.

Jorg Angher et al. in U.S. Pat. No. 4,711,122, issued Dec. 8, 1987 disclose a mud excluder that consists of a flexible casing that is attached to the borehole tool to form a cavity fitted around and adjacent to a rotating acoustic transducer. The cavity is filled with an acoustically low-loss fluid. The mud excluder includes a vertically planar acoustic window. The problem here is again the vertical window which causes internal reflection interference with received signals. Furthermore, the flexible casing is subject to rupture in the presence of a rough hole.

U.S. Pat. No. 4,382,290 issued May 3, 1983 to R. M. Havira provides a circumferential televiewer having a slanted acoustic exit window to reduce ghost reflections but does not teach or suggest that there is a problem with lengthy beam trajectories through the drilling fluid. The exit window is of plastic such as polyurethane.

A somewhat similar approach was taken by F. H. K. Rambow in U.S. Pat. No. 5,212,353, issued May 18, 1993. Whereas the '290 patent recommended a window slope of 20° to 30°, the '353 patent suggests use of a 3° to 5° angle. Here again, there is no suggestion that the acoustic trajectory path length should be reduced. The '353 patent apparently depends entirely upon beam focussing using a curved transducer element which is said to substantially improve acoustic penetration through heavy mud. The acoustic window is formed of a polymethylpentane (TPX) plastic.

U.S. Pat. No. 4,876,672, issued Oct. 24, 1989 to S. C. Petermann et al. provides a borehole televiewer in which the rotating transducer is exposed directly to the borehole fluids during a logging operation. That arrangement is subject to damage to the exposed delicate transducer mechanism. There is no suggestion of trajectory path length reduction or abatement of ghost reflections.

There is a need for an acoustic logging tool that will maximize the signal-to-noise ratio of acoustic signals reflected from the sidewall of a borehole and one in which the internal ghost reflections are suppressed. The tool should be readily adaptable to different-sized boreholes, should be rugged and easily repairable after hard use and inexpensive to manufacture.

SUMMARY OF THE INVENTION

The downhole acoustic logging tool includes an enclosure for containing a rotating acoustic transducer for circumferentially insonifying the sidewall of a fluid-filled borehole through an acoustic window associated with the enclosure. The transducer insonifies the sidewall by launching a pulsed acoustic beam along a radial trajectory, a portion of the length of which passes through the highly attenuating borehole fluid. The insonified sidewall returns acoustic signals reflected therefrom, to the transducer. The radius of the tool is substantially less than the radius of the borehole. A solid, acoustically transparent shroud having a radius commensurate with the radius of the borehole, surrounds the acoustic window associated with the transducer-containing enclosure. The acoustic coefficient of attenuation of the shroud is significantly less than the coefficient of attenuation of the borehole fluid. The shroud provides a means for increasing the signal-to-noise ratio of acoustic signals reflected from the borehole sidewall by replacing a substantial volume of the borehole fluid having a high attenuation coefficient that originally surrounded the transducer with a like volume of a medium characterized by a much lower attenuation coefficient. The shroud reduces the length of that portion of the beam trajectory that is constrained to pass through the borehole drilling fluid.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
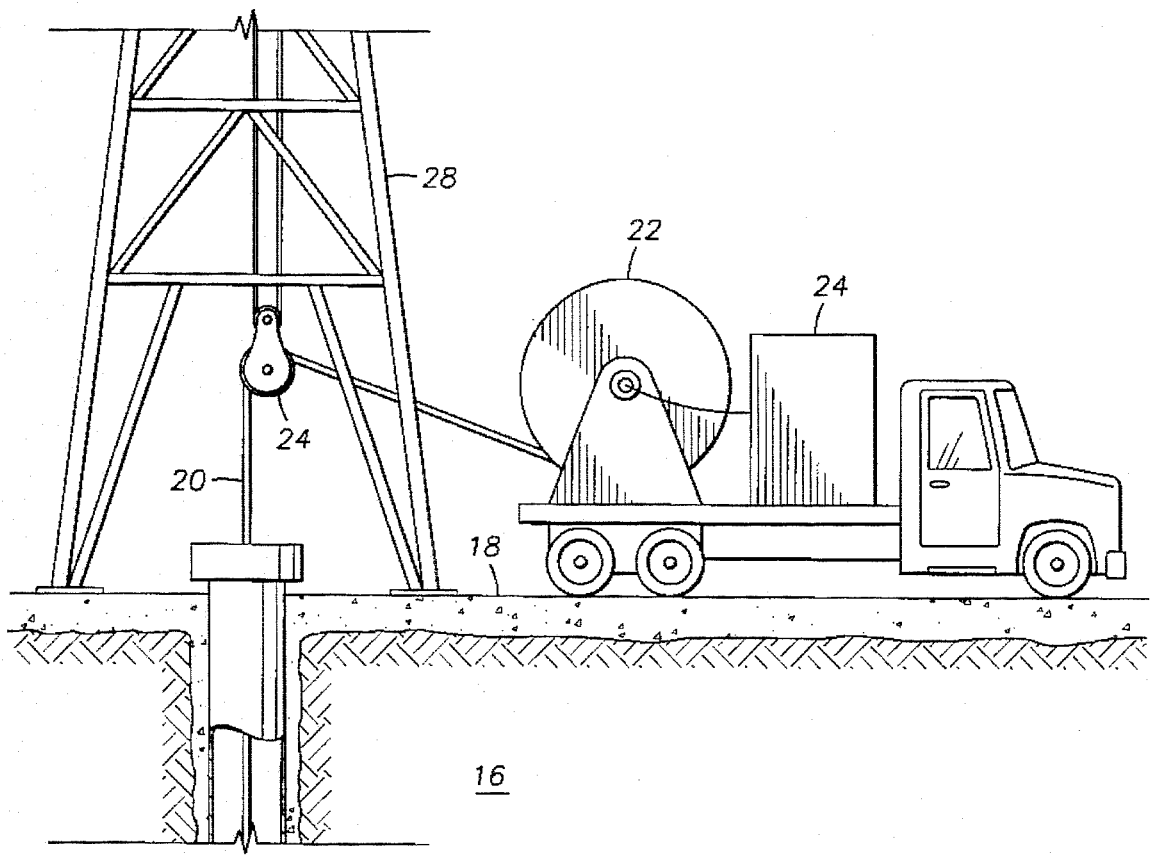
FIG. 1 illustrates the logging tool of this invention suspended in a borehole.
Figure 1:
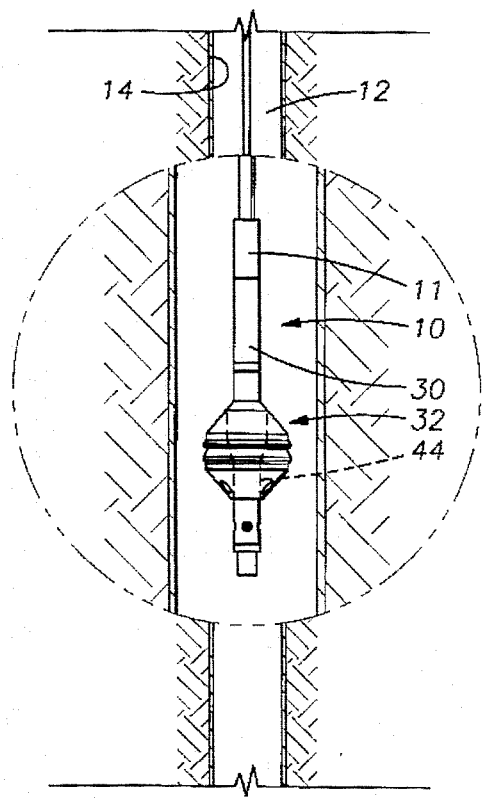

Please refer to FIG. 1 where there is shown a logging sonde 10 suspended in a circular borehole 12 having a sidewall 14, drilled into an earth formation 16 beneath the surface of the earth 18. The hole is assumed to be filled with a drilling fluid. The logging sonde is suspended by a standard 7-conductor logging cable 20 that is deployed from a draw works 22 over a suitable pulley 24 mounted on derrick 28. Surface control electronics 29 are provided for programming the operation of the instrumentation carried by sonde 10 in a compartment 11 and for receiving, processing and displaying signals received from the logging sonde 10. In operation, sonde 10, the radius of which is substantially less than the radius of the borehole, is centered in the borehole using centralizers of any well known type (not shown).

Sonde 10 includes a circumferential borehole televiewer assembly shown schematically as 30. One such televiewer is described in U.S. Pat. No. 5,179,541 issued Jan. 12, 1993 to V. Weido, assigned to the assignee of this invention and which is incorporated herein by reference as a showing of one type of televiewer. A pressure-compensated, liquid-filled, longitudinally-disposed transducer enclosure, sealed from fluid invasion by acoustic window 44 (to be described later with FIG. 2) is included as part of televiewer assembly 30 which is enshrouded by a solid mud excluder 32.

Figure 2:
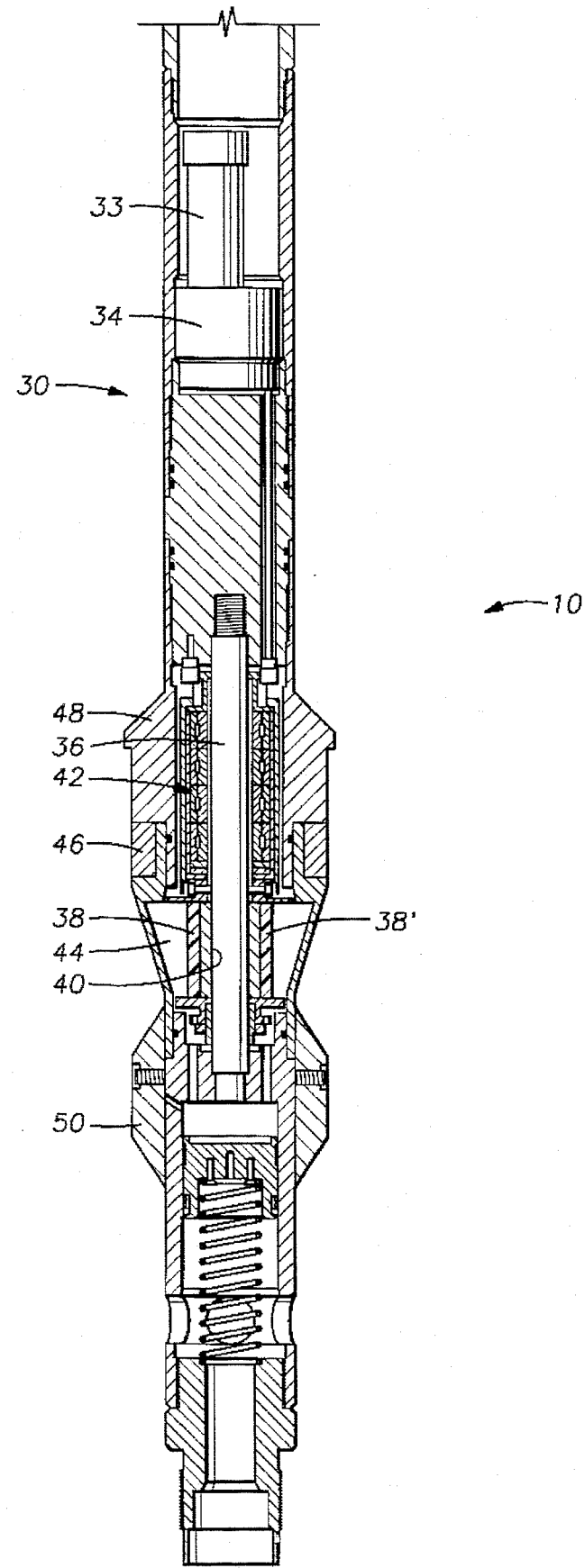
FIG. 2 is a showing of a standard-sized televiewer-type logging tool.

FIG. 2 is a cross section of the lower part 30 of sonde 10 (FIG. 1) that contains the televiewer assembly 30 including a rotary acoustic transducer assembly that includes an electric motor 33 which, through a geared transmission assembly 34, rotatingly drives a shaft 36.

Piezoelectric transducers 38 and 38' are mounted on opposite faces of a two-sided rotor 40 that is secured to shaft 36. The transducers are designed to launch an acoustic beam along a trajectory normal to the borehole sidewall 14. Preferably the transducers are spherically focussed and configured to minimize the side lobes of the acoustic beam in a manner well-known to the art. As is evident from FIG. 1, a portion of the acoustic beam must transit the fluid that fills the borehole 12.

A stack of four rotary transformers, generally shown as 42, provide power to, and receive reflected signals from, transducers 38 and 38'. The rotary transformers provide the interface for transmitting control signals to and for transmitting received reflected signals from sonde 10 to surface control and electronics unit 29 over the signal lines in cable 20. Further details concerning signal gathering, signal transmission and signal processing may be found in the '541 patent but are not given here to avoid unnecessary prolixity.

Transducer rotor assembly 40 and transducers 38 and 38' are sealed from borehole fluid invasion and are enclosed in a pressure-compensated enclosure formed by tapered acoustically transparent window 44 that is disposed opposite transducers 38 and 38'. Window 44 is composed of a desired plastic that has an acoustic impedance approximating the acoustic impedance of the fluid that fills the borehole. Any one of a number of acoustically transparent plastics having an acceptably low coefficient of acoustic attenuation may be used such as polytetraflouroethylene, polyurethane, polymethylpentane, and the like. The enclosure is filled with an acoustically transparent liquid such as common brake fluid.

Acoustic window 44 is preferably tapered inwardly towards the bottom of the sonde. The purpose of the taper is to prevent internal reflections from being received by the transducer elements 38 and 38' as false ghost reflections. The taper may have a first angular inclination in a preferred longitudinal direction. The absolute value of the angular inclination lies in the range from 3° to 30°. The inclination of the acoustic window 44 may cause the acoustic pulse beam to be refracted slightly away from the normal to the sonde depending upon the impedance contrast (if any) between the acoustic window 44 and the drilling fluid. However, the refraction effects are trivial compared to the ghost interference that would otherwise be present.

Acoustic window 44 is held in place on top by a suitable clamping strap 46, secured to a streamlined jacket 48 that contains rotary transformer stack 42. The bottom portion of the acoustic window is protected by a collar 50.

FIG. 2 represents the essentials of a naked, standard-sized logging sonde embodying a circumferential televiewer. For slim holes, this configuration would be adequate. However as explained earlier, in large-diameter holes, the acoustic beam must propagate through a considerable path length within the borehole fluid. The borehole fluid may have a very high coefficient of attenuation. To improve the reflected signal-to-noise ratio, it is preferred that a large portion of the fluid travel path of the acoustic beam be replaced by a medium that has a coefficient of attenuation that is substantially lower than that of the drill fluid. One way to reduce the attenuation of the acoustic beam is to enshroud the acoustic window 44 with a more acoustically benign medium than drill fluid.

Figure 3:
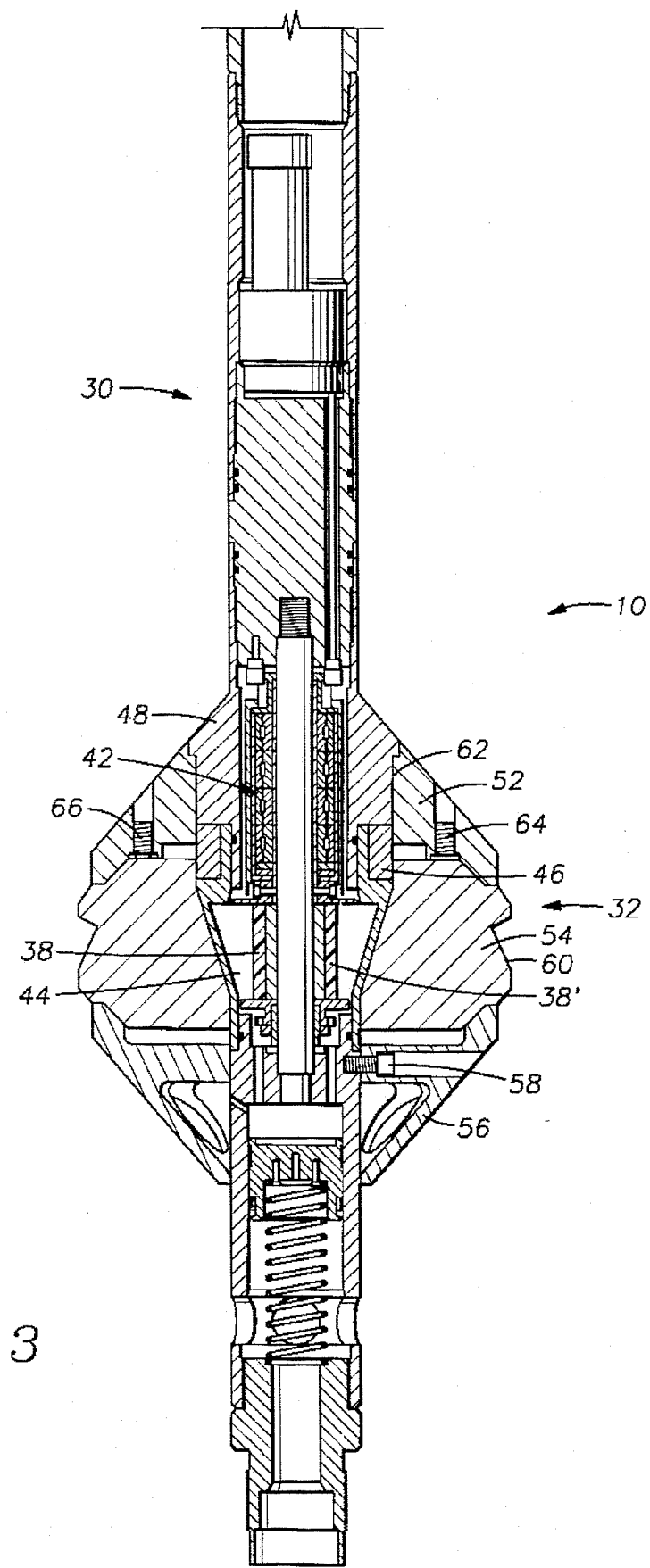
FIG. 3 shows a mud excluder enshrouding the standard-sized logging tool of FIG. 2.

FIG. 3 shows the details of the preferred form of mud excluder assembly 32. Mud excluder assembly 32 consists essentially of four parts: an upper support plate 52, a shroud 54, a lower support plate 56 and several shear screws of which only one, 58, is visible in the view of FIG. 3. The shroud is a solid, made of a material taken from the group of plastics that consists of polymethylacrylate, polycarbonate polymethylflouroethylene, polyphenylsulfide or polymethylpentane or any other solid medium that has an acceptably low coefficient of acoustic attenuation. An added constraint of the shroud is that its acoustic impedance should match as closely as possible the acoustic impedance of the fluid inside the enclosure as well as the fluid bathing the exterior of the shroud. Since the impedance of the well-bore fluid may vary from 1.6 MPa * s/m (1.6 megapascal-seconds per meter) to more than 2.5 MPa * s/m, an exact match will not be possible. But so long as the impedance of the shroud is less than about 5.0 MPa * s/m, we have found that the acoustic insertion losses are minimal, that is, less than 3 dB and the losses are dominated by the attenuation coefficient of the shroud material which should be less than 1 dB/cm.

The inner surface of shroud 54 is tapered at the same angle of inclination and in the same directional sense as acoustic window 44 so that the shroud fits snugly around the acoustic window 44. The term "snugly" is used in its ordinary dictionary meaning of "fitting closely and comfortably". The outer surface 60 of shroud 54 is preferably longitudinally tapered inwardly towards the top of the sonde, that is, in a directional sense opposite to the longitudinal taper of acoustic window 44. By that stratagem, refraction suffered by an acoustic beam issuing from acoustic window 44 is corrected by reason of the opposite taper of surface 60. Surface 60 is tapered by a second angular inclination that lies in the range between 3° and 30°. The absolute difference between the first and second angular inclinations lies in the range of 0° to 27°. Although the angular inclinations are preferably opposite in directional sense they are not necessarily equal because the acoustic index of refraction and the dimensions of the media comprising the enclosure and the shroud may not be exactly compensatory.

It is preferable that shroud 54 have a smooth finish and that it be made in a single piece because scratches or cuts interrupt the acoustic beam to cause a discontinuity in the received reflected signals.

The outer diameter of shroud 54 is selected in accordance with the diameter of the borehole. The whole purpose of this invention is to increase the signal-to-noise ratio of signals received after reflection from the borehole sidewall. That desideratum is accomplished by replacing a maximum volume of borehole fluid having a high coefficient of attenuation with a medium having a substantially lower coefficient of attenuation. The outer diameter of the shroud should approach the borehole diameter but with a suitable clearance to allow for passage through tight spots in the hole. Given a standard-diameter sonde, a plurality of shrouds are provided having a wide range of diameters to fit a single standard-sized tool to many differently-sized boreholes which is a feature not considered by earlier workers in the field.

In operation, the televiewer is mounted at or near the bottom of a logging sonde. To enshroud the borehole televiewer, collar 50 is removed and the top retaining plate 52 is slipped up sonde 10, over clamping strip 46 and jacket 48, coming to rest upon abutting a small shoulder 62. Next, shroud 54 is slid up against upper support plate 52. Lower support plate 56 is then pushed up against shroud 54 whereupon the three shear screws such as 58 are tightened to secure the respective parts of the mud excluder firmly in place. Set screws 64 and 66 provide means for aligning shroud 54 with acoustic window 44.

It will be observed that the top and bottom of mud excluder 32 are tapered. The purpose of the taper is to center the tool to allow it to ease its way through tight spots in the hole. The logging operation is usually performed as the tool is drawn upwards and out of the hole. In the event that the mud excluder 32 becomes stuck against an obstruction in the hole, the shear screws such as 58 give way such that the mud excluder, which is not very costly, remains in the hole while the very expensive televiewer is pulled clear of the stuck mud excluder and safely up out of the borehole. It should further be recognized that the shroud may become marred and scratched as it is deployed in and out of a hole. It is preferable to make the shroud from a suitable material such as polymethylflouroethylene whose surface can be re-machined after each deployment. The shroud construction material has been preferably selected from one of the well-known plastic materials but it could be made from a suitable ceramic-like material such as the machinable glass ceramic MACOR® made by Corning glass works.

Preferably, the shroud is a single unit of generally cylindrical shape, a configuration that is suitable for use with a sonde having the general design shown in FIG. 2. If, for example, the taper of acoustic window 44 were inclined inward towards the top of the sonde instead towards the bottom as shown in the Figures, the simple assembly procedure explained earlier could not be used. It would then be necessary to provide shroud 54 in two semicircular halves that would be wrapped around window 44 and perhaps held in place by some form of spring clips. The split line between the two halves (not shown in the Figures) would form an acoustic discontinuity that would introduce a transient during each scan of the recorded data signals. The orientation of the shroud split-line should be aligned with the N/S fiducial indicia provided by the magnetometer so that the resulting transient coincides with the magnetometer index that defines the azimuthal orientation of the televiewer display.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A downhole acoustic logging tool for imaging the texture of the sidewall of a fluid-filled borehole, the radius of the logging tool being substantially less than the radius of a borehole under consideration, comprising:

an acoustic transducer means for insonifying a borehole sidewall by launching a pulsed acoustic beam directed along a trajectory normal to the borehole sidewall, a portion of the path length of said trajectory passing through the borehole fluid between the logging tool and the borehole sidewall, said transducer including means for receiving acoustic energy pulses reflected from said borehole sidewall;

a liquid-filled, pressure-compensated enclosure formed in said logging tool for containing said acoustic transducer means, the enclosure being sealed from invasion by said borehole fluid by an acoustic window positioned opposite said acoustic transducer, the acoustic window being characterized by a first longitudinal angular inclination;

means for enshrouding said acoustic window by a solid acoustically-transparent medium having an acoustic attenuation coefficient substantially lower than the acoustic attenuation coefficient of said borehole fluid;

said means for enshrouding is characterized by a cylindrical structure that has an inner surface and an outer surface, the inner surface being configured to contact and snugly fit around said acoustic window, at least that portion of the outer surface through which the pulsed acoustic beam is launched being longitudinally inclined by a second angular inclination, the cylindrical structure having an outer angular radius selected to be commensurate with the radius of the borehole under consideration.

2. The logging tool as defined by claim 1, wherein:

said means for enshrouding optimizes the signal-to-noise ratio of reflected acoustic pulses by minimizing that portion of the trajectory path-length of the acoustic beam that passes through the more highly attenuating borehole fluid.

3. The logging tool as defined by claim 1, wherein:

said means for enshrouding displaces a selected volume of borehole fluid that has a high acoustic attenuation coefficient with a like volume of a medium that has a desired lower acoustic attenuation coefficient thereby to optimize the signal-to-noise ratio of acoustic pulses reflected from said borehole sidewall.

4. The logging tool as defined by claim 3, wherein:

the displaced volume of borehole fluid substantially comprises at least the mass of borehole fluid that would have surrounded the acoustic window.

5. The logging tool as defined by claims 2 or 3, wherein:

said cylindrical structure consists of at least two substantially similar semi-cylindrical members that fit snugly around said acoustic window and that may be held in place around the acoustic window by upper and lower supports.

6. The logging tool as defined by claim 4, wherein:

said cylindrical structure is formed of a plastic selected from the group of plastics consisting of polymethymethacrylate, polycarbonate, polytetraflouroethylene, polyphenylsulfide and polyetheretherketone.

7. The logging tool as defined by claim 5, wherein:

the first and second longitudinal angular inclinations are in the range of 3° to 30°, the difference between the first and the second longitudinal angular inclinations ranging from 0° to 27°.

8. A method for optimizing the signal-to-noise ratio of acoustic signals reflected from a borehole sidewall after insonification thereof by acoustic radiation from an acoustic logging tool deployed in a fluid-filled borehole, comprising the steps of:

providing a longitudinally-disposed enclosure extending over a selected region of a logging tool;

mounting a rotatable acoustic transducer in said enclosure;

sealing said enclosure against invasion by borehole fluid by providing an acoustic window opposite said acoustic transducer, said acoustic window being longitudinally inclined by a first preselected angle, said enclosure being filled with an acoustic transmission medium;

insonifying the borehole sidewall with a pulsed acoustic beam transmitted from the acoustic transducer, the beam being directed along a trajectory substantially normal to the borehole sidewall, a portion of the path of said trajectory passing through the borehole fluid that surrounds the region on the logging tool occupied by the acoustic window that seals said enclosure;

receiving, by said acoustic transducer, acoustic pulses reflected from said borehole sidewall;

replacing a portion of the borehole fluid lying in the path of said beam trajectory with a solid acoustically transparent medium having an acoustic attenuation coefficient substantially less than the acoustic attenuation coefficient of said borehole fluid;

forming said solid acoustically transparent medium into a substantially cylindrically-shaped shroud having inner and outer surfaces, the inner surface being configured to contact and snugly embrace said inclined acoustic window, and setting the diameter of the outer surface to be commensurate with the diameter of the borehole in which the logging tool is deployed.

9. The method as defined by claim 8, comprising:

enshrouding said acoustic window by said solid acoustically transparent medium thereby to maximize the amplitude of the reflected acoustic pulses by minimizing the transmission path-length of the beam trajectory through the highly-attenuating borehole fluid.

10. The method as defined by claim 9, comprising:

providing a plurality of shrouds having different predetermined outer diameters but substantially the same inner diameters for accommodating a single type of logging tool having a predetermined standard diameter to any one of a plurality of differently sized boreholes.

11. The method as defined by claim 10, comprising:

providing each of said plurality of shrouds in the form of at least two substantially similar semi-cylindrical portions which may be removably fitted over, and held in place around, said acoustic window by upper and lower retaining means.

12. The method as defined by claim 9, comprising:

eliminating ghost reflection interference from the reflected acoustic pulses by longitudinally inclining the portion of the outer surface of said shroud, through which said acoustic beam is transmitted, at a second selected angle in the range of 3° to 30°.

13. The method as defined by claim 12, comprising:

forming said shroud from a plastic material selected for physical characteristics that allow the acoustic beam-transmitting portion of the exposed surface of said shroud to be refinished following abusive deployment in said borehole thereby to eliminate losses in the signal level due to scattering of the acoustic beam by imperfections in the exposed surface of said acoustically transparent shroud.

14. The logging tool as defined by claim 5, wherein:

said first and second angular inclinations are inclined in opposite longitudinal directional sense with respect to one another.

15. The logging tool as defined by claim 5, wherein said shroud is composed of a material characterized by an attenuation coefficient less than 1 dB/cm and an acoustic impedance less than 5 MPa * s/m.

* * * * *